United States Patent
Borchers et al.

Patent Number: 5,670,758
Date of Patent: Sep. 23, 1997

[54] ACOUSTIC PROTECTION ON PAYLOAD FAIRINGS OF EXPENDABLE LAUNCH VEHICLES

[75] Inventors: Ingo U. Borchers, Uhldingen; Stephan T. Laemmlein, Markdorf; Peter Bartels; Achim Rausch, both of Immenstaad; Markus Faust, Salem, all of Germany; Jan A. F. Coebergh, Uetikon A. See, Switzerland; Klaus Koeble, Meckenbeuren, Germany

[73] Assignees: Oerlikon-Contraves AG, Zuerich, Switzerland; Dornier GmbH, Friedrichshafen, Germany

[21] Appl. No.: 493,050
[22] Filed: Jun. 21, 1995

[30] Foreign Application Priority Data

Apr. 20, 1995 [CH] Switzerland ............ 01 129/95-9

[51] Int. Cl.⁶ ............................................. E04B 1/82
[52] U.S. Cl. .................. 181/286; 181/288; 181/292; 181/294; 181/295
[58] Field of Search ........................... 181/210, 286, 181/288, 290, 292, 294, 295

[56] References Cited

U.S. PATENT DOCUMENTS

| | | | |
|---|---|---|---|
| 3,887,031 | 6/1975 | Wirt | 181/292 |
| 4,667,768 | 5/1987 | Wirt | 181/286 |
| 5,185,504 | 2/1993 | Jen | 181/286 |
| 5,445,861 | 8/1995 | Newton et al. | 181/292 X |

*Primary Examiner*—Khanh Dang
*Attorney, Agent, or Firm*—Browdy and Neimark

[57] ABSTRACT

By means of this acoustic protection it is possible to protect the payloads of expandable launch vehicles effectively against noise emissions from the rocket propulsion system which result in damage of the payloads. For this purpose acoustic absorbers (8) tuned to a defined frequency range are provided and are arranged in foamed plastic mats (7) disposed on the insides (6) of the payload fairing (1). The acoustic absorbers (8) are composed of a cup-shaped lower part (12) and an upper part (13) having a horn (18). The horn (8) tapers in a curved-conical manner from a larger diameter ($D_m$) to a smaller diameter ($D_r$) and projects into the lower part (12) by a defined distance (a) from a bottom (14) thereof. Slits (21) for the dissipation of the directed flow energy occurring in the horn (18) are disposed in the wall of the horn in the area of the smaller diameter ($D_r$).

31 Claims, 6 Drawing Sheets

5,670,758

1

ACOUSTIC PROTECTION ON PAYLOAD FAIRINGS OF EXPENDABLE LAUNCH VEHICLES

FIELD OF THE INVENTION

The invention relates to an acoustic protection on payload fairings of expendable launch vehicles, wherein the acoustic protection is fastened on the payload fairing of the expendable launch vehicles.

BACKGROUND OF THE INVENTION

In accordance with information contained in Brochure No. 3012, 1987, of Oerlikon-Bührle Holding Ltd., Zürich, Switzerland, payload fairings of expendable launch vehicles are intended to protect payloads, for example satellites to be lifted into orbit, against damage on the ground as well as during flight through the atmosphere. Because of their position on the nose of the launch vehicle in particular, the payload fairings are subjected to strong aerodynamic forces and severe heating, due to air friction in line with the increase in velocity. Noise emissions occur in connection with such launch vehicles during the start-up phase, bun mainly during lift-off under full thrust, which can be more than 140 dB. Such intense acoustic loads can lead to damage of the payload, so that safety and reliability problems can occur there, which can lead, for example, to the failure of sub-systems such as solar cells, control and regulating systems, antennas, mechanisms, experiments, etc. i.e. at the limit, even to the total failure of the actual payload mission. The structure of the payload fairing offers a certain amount of protection against the above mentioned effects of the noise, but is insufficient in some cases, so that additional measures are required.

The generally known measures for preventing or reducing interfering damaging sound consist in equipping the walls with sound-absorbing materials, for example insulating panels or mats made of the most varied suitable materials. Multi-shell structures comprising damping and reverberant materials and alternatingly applied are also used. The design of acoustic protection on payload fairings of launch vehicles needs to be such that the acoustic protection must become effective particularly in a defined frequency range of the noise generated during lift-off which is critical for the payloads in respect to rigidity and/or strength. As verified in tests, the disadvantage in em-ploying the above described conventional measures for noise reduction resides in that such an acoustic protection would be relatively heavy and much too large, so that valuable payload accomodation volume would be lost.

OBJECT AND SUMMARY OF THE INVENTION

It is the object of the invention to propose an acoustic protection on payload fairings for expandable launch vehicles which effectively protects the payloads against noise emissions of the propulsion systems and does not have the disadvantages of conventional protective measures mentioned above.

This object is attained by means of the invention recited in claim 1. In this case acoustic absorbers are provided which are tuned to a defined frequency range. The acoustic absorbers are disposed on foamed plastic mats fastened on the inside of the payload fairing.

In accordance with a particular embodiment, the acoustic absorbers are assembled from a cup-like lower part and an upper part having a horn, wherein the horn tapers in a

2 curved-conical manner from a large diameter to a small diameter and projects into the lower part up to a defined distance from its bottom. In the area of the smaller diameter, crown-shaped slits are provided in the wall of horn for dissipating the directed energy flow occurring in the horn.

The advantages achieved by means of the invention reside in that the noise reduction values, proved by means of tests, in the frequency range <90 Hz critical for the payload in respect to rigidity and/or strength, cannot be achieved by any known acoustic protection of comparable size or weight. To achieve the same effects, an acoustic protection of the conventional type would require a volume which would correspond to approximately six times that of the acoustic protection in accordance with the invention. The noise reduction values achieved have the effect of preventing damage, caused by noise emissions of the rocket propulsion system, to payloads which meet the mechanical quality requirements. The suggested acoustic protection is light and requires little space. The application of the foamed plastic mats equipped with acoustic absorbers by banding with the help of underpressure guarantees a complete connection with the inside of the payload fairing.

The invention will be explained in detail below by means of an exemplary embodiment and the attached drawings.

DETAILED DESCRIPTION OF THE PREFERRED EMBODIMENT

Figure 1:
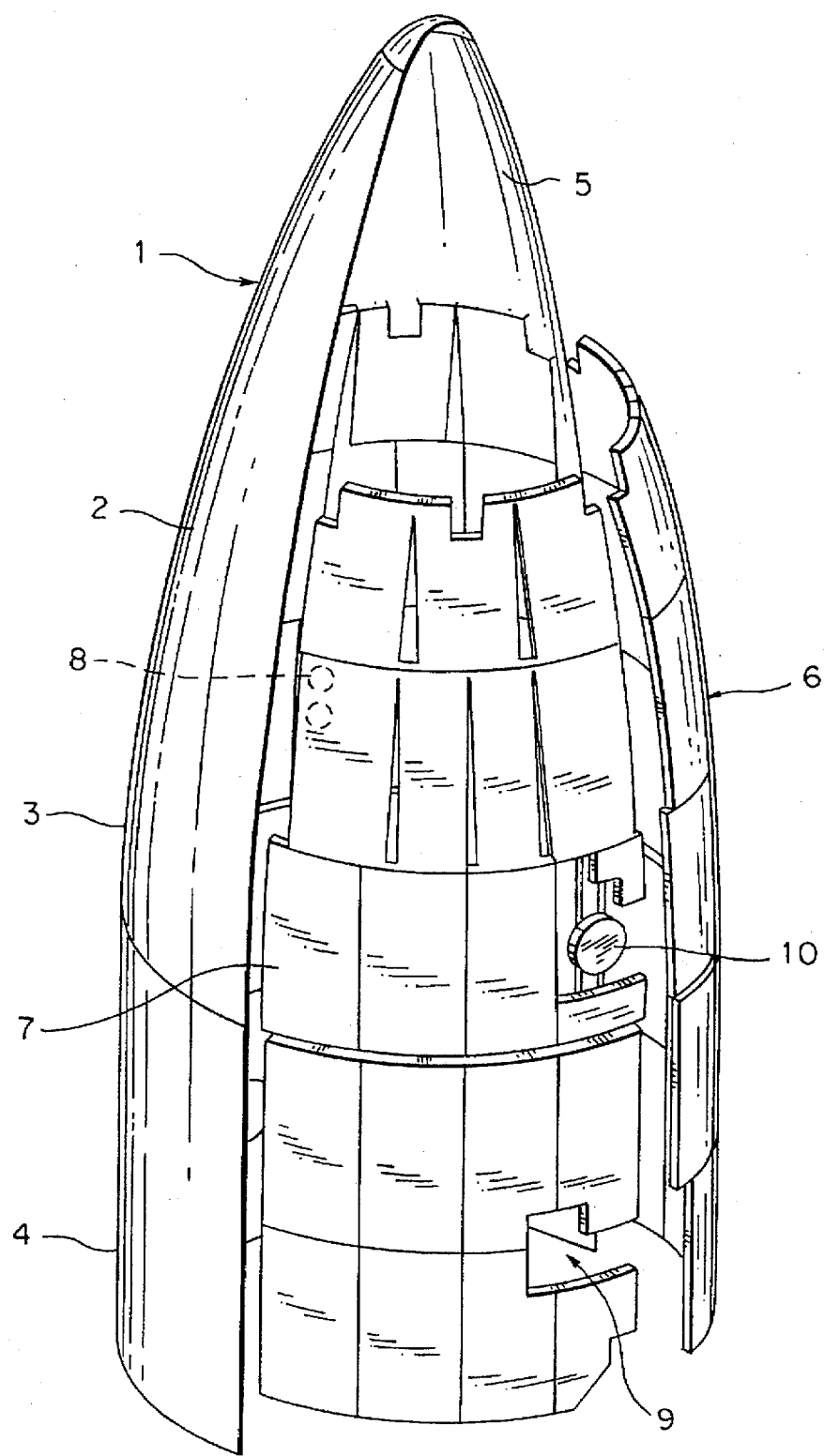
FIG. 1 is a perspective representation of half of a payload fairing of an expandable launch vehicle, both halves of which are provided with the acoustic protection in accordance with the invention.

A payload fairing of an expandable launch vehicle is identified by 1 in FIG. 1 and consists of two half shells 2, only one of which is represented, which has an ogival or conical and a cylindrical part 3, 4. An acoustic protection 6 is fastened on the insides 5 of the half shells 2, consisting of sound-absorbing panels in the form of foamed plastic mats 7 lined up with each other, on which acoustic absorbers 8, which will be described in detail below by means of FIGS. 3 to 7, are disposed. The acoustic absorbers 8 are arranged on a side of the foamed plastic mats 7 facing the payload accomodation volume 9 and are of different dimensions, taking into consideration the ogival or conical and cylindrical part 3, 4 of the payload fairing 1. An opening, identified by 10, can be cut into a foamed plastic mat 7 with acoustic absorbers 8 even after integration of the acoustic protection 6, so that access to the payload, for example in the form of a satellite, is possible following the completion of the assembly of the acoustic protection. A thermal protection insulation layer 25 (FIG. 3) is provided on the exterior of the payload fairing 1 and is intended to prevent the unacceptable heating of the payload fairing and the payload.

Figure 2:
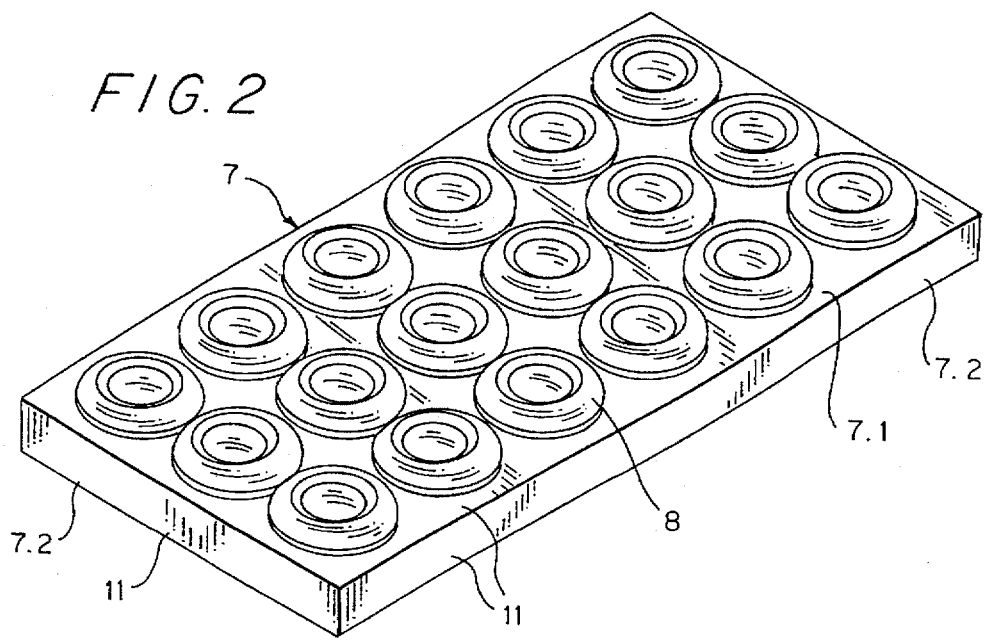
FIG. 2 is a perspective representation of a foamed plastic mat of the acoustic protection with several acoustic absorbers.

According to FIG. 2, a foamed plastic mat 7 is equipped for example, with eighteen acoustic absorbers, of circular cross section, which are fastened in a manner to be described in detail in connection with FIG. 3. The foamed plastic mats are preferably made of reticulated polyimide, for example the foamed plastic Solimide AC-406 of the firm Illbruck in Switzerland. In an advantageous form they are of a thickness of 10 cm. The foamed plastic mats 7 have special mechanical strength properties. The rigidity of the foamed plastic is very low in the circumferential direction parallel with the surface of the payload fairing 1, so that the dynamic behavior of the half shells 2 of the payload fairing 1 is not significantly affected when being separated and jettisoned from the launch vehicle. The strength of the foamed plastic perpendicular to the top of the payload fairing 1 is sufficiently great so that the absorbers 8 are securely held during the heavy vibrations of the payload fairing 1 during the start-up phase of the launch vehicle as well as during the extreme shock and deformation loads when the payload fairing 1 is separated in two halves from the launch vehicle. These properties are attained by an appropriate alignment of the foamed plastic pores. They have an elongated form in the shape of an oval. The longitudinal axis of the pores is aligned perpendicularly with the surface of the payload fairing 1. On the top 7.1 and the lateral faces 7.2, the foamed plastic mats are covered with a thin protective foil 11 consisting, for example, of polyester (Orcon), which is intended to prevent the penetration of particles (dust, dirt) into the payload accomodation volume. The protective foil 11 has fine perforations for assuring differential pressure compen-sation during the ascent of the launch vehicle. As will be des-cribed in more detail below by means of FIGS. 8 and 9, the under-sides of the foamed plastic mats 7 not covered by the protective foil are bonded to the insides 5 of the half shells 2 with by means of an under-pressure integration device. 100% adhesion, effective on the entire supporting surface of the foamed plastic mats 7, is achieved by means of this process.

In FIGS. 3 to 7, a lower part of the acoustic absorber 8 is identified by 12 and an upper part by 13. The lower part 12 is embodied in a cup shape and has on ist bottom 14 a circular stiffening bead 15, from which several radial beads 16 extend in the direction toward the edge of the bottom 14. A flange 17 is provided on the upper rim of the lower part 12. The lower part 12 is preferably made of an aluminum sheet of a thickness of less than 0.5 mm, in particular 0.3 to 0.4 mm, by a deep-drawing process. The upper part 13 has a horn 18 which, in the area of its opening with the largest diameter (horn mouth), makes a transition via a torus 19 into an edge 20, angularly shaped in cross section. In connection with lower noise levels (<130 dB) it is possible to further increase the absorption effect of the absorber 8 by the disposition of a permeable layer (not shown in the drawings) across the horn mouth $D_m$. The horn 18 tapers in a conical arc shape from the opening with the larger diameter $D_m$ (horn mouth) toward an opening of smaller diameter $D_t$ (horn throat). Five slits 21 are provided in the area of the horn throat, which have sharp edges 21.1 and which are offset in respect to each at an angle of 72° (horn crown). The five slits of the horn crown have a flow-through area of a width b and a height c. The individual slits have an arc-shaped curvature at the top. Increased structural tolerances in particular in respect to the distance a to the bottom become possible because of the arc- and crown-shaped design of the slits 21. In an advantageous embodiment, wherein the slits are adapted to a high sound level, (>130 dB), the width b is 5.6 mm and the height c is 20 mm. The upper part 13 is preferably made of an aluminum sheet of a thickness of less than 0.5 mm, in particular 0.3 to 0.4 mm, by a spinning process. The upper part 13 and lower part 12 can also be made from other shet-metals or plastic (but then possibly with different dimensions). The injection molding process can be advantageously used when the lower part 12 and the upper part 13 are made of plastic. In the course of assembling the lower part 12 and the upper part 13, the angle-shaped rim 20 is connected with the rim 17 by crimping, wherein a crimped flange 22 is formed and the horn 18 projects into the lower part 12 as far as a defined distance a from the bottom 14. The material, dimensions and production process are selected such that they resist all mechanical and thermal loads during the ascent of the launch vehicle and the separation of the payload fairing 1 from the launch vehicle. Circular cutouts from the foamed plastic mat 7 are indicated by 23 and the acoustic absorbers 8 are inserted into them, wherein they rest with the crimped flange 22 on the top 7.1 of the foamed plastic mat 7 and are bonded together with it. A bonded- on foamed plastic disk 24 is provided at the bottom 14 of the acoustic absorber 8. The mechanical connection of the absorber 8 with the payload fairing 1 is provided exclusively via the foamed plastic mat 7 and the foamed plastic disks 24.

The foamed plastic disk 24 has the same particular mechanical properties in regard to rigidity and strength as the foamed plastic mat 7 and is preferably made of the same material.

Figure 3:
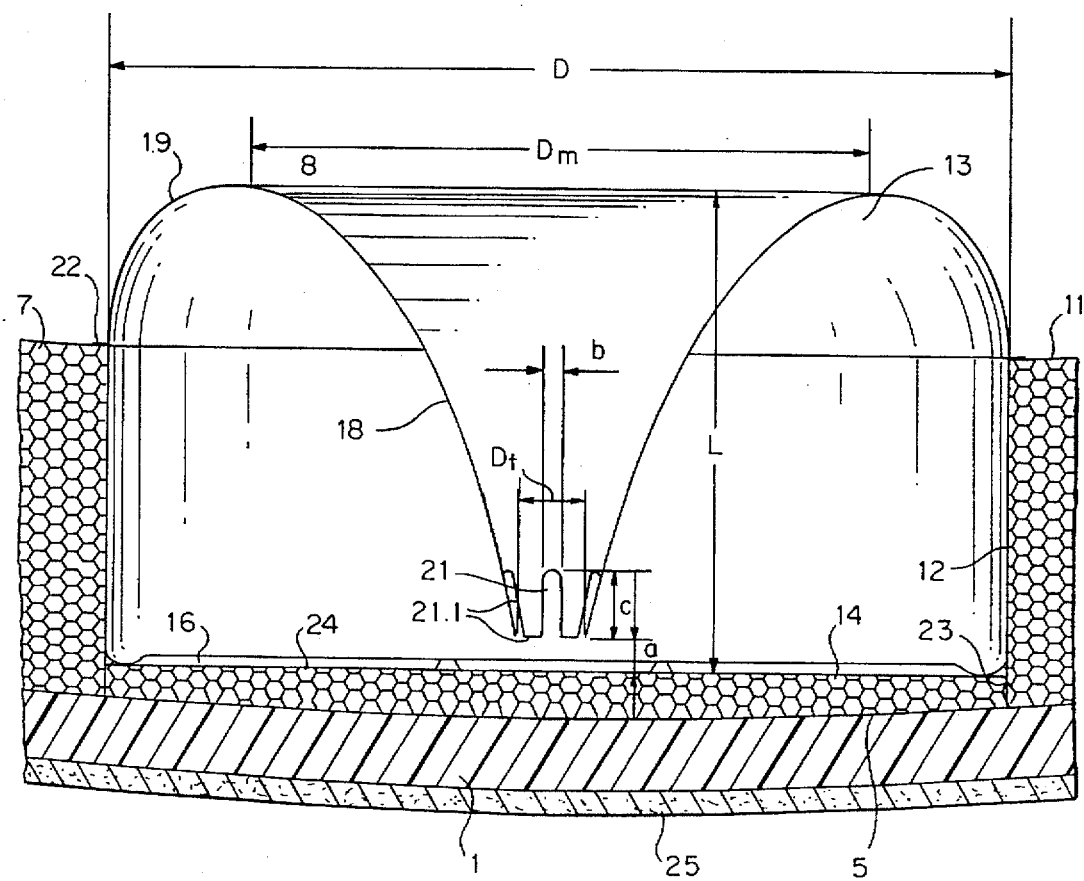
FIG. 3 is a partial cross section through a wall of the payload fairing with an acoustic absorber of the acoustic protection.
Figure 4:
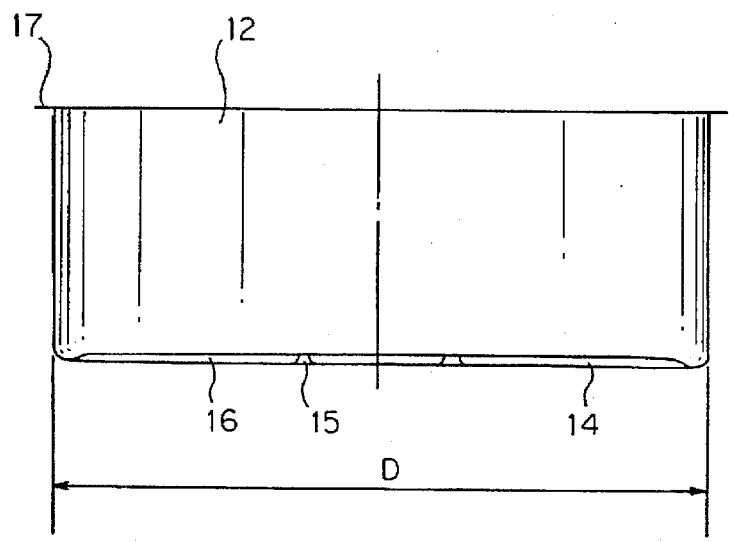
FIG. 4 is a longitudinal section through a lower part of the absorber along the line IV—IV of FIG. 5.
Figure 5:
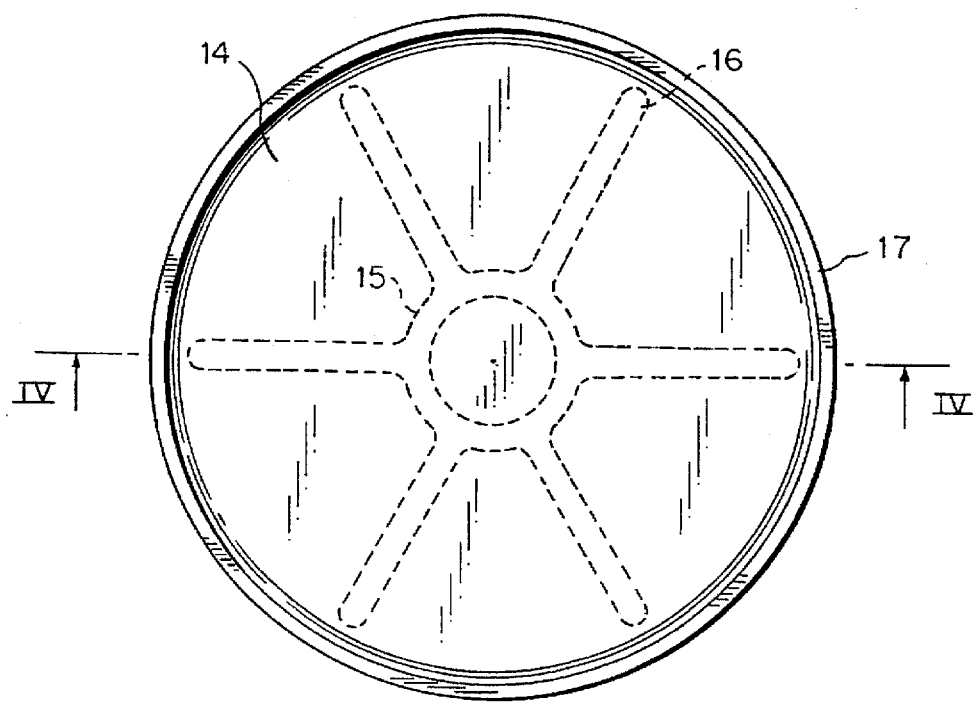
FIG. 5 is a cross section of the lower part of the absorber.
Figure 6:
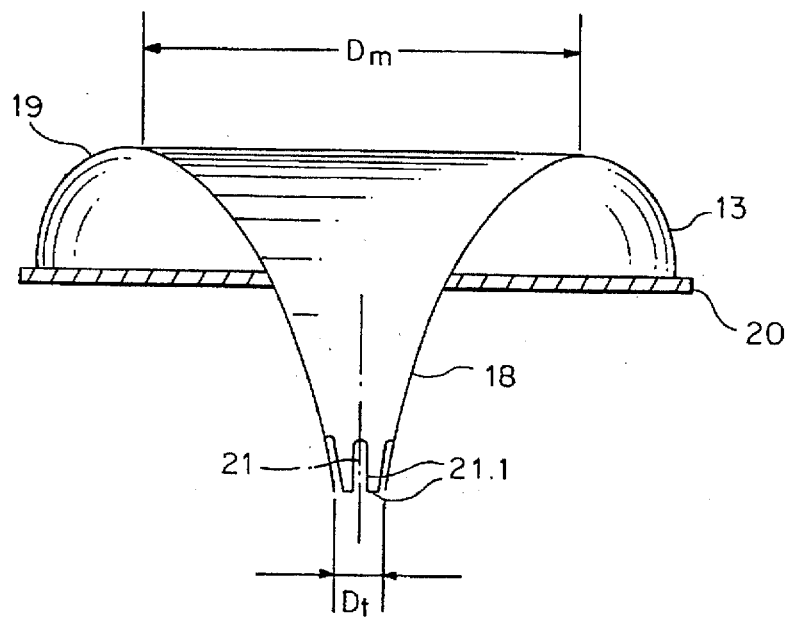
FIG. 6 is a longitudinal section through the upper part of the absorber viewed along the line VI—VI of FIG. 7.
Figure 7:
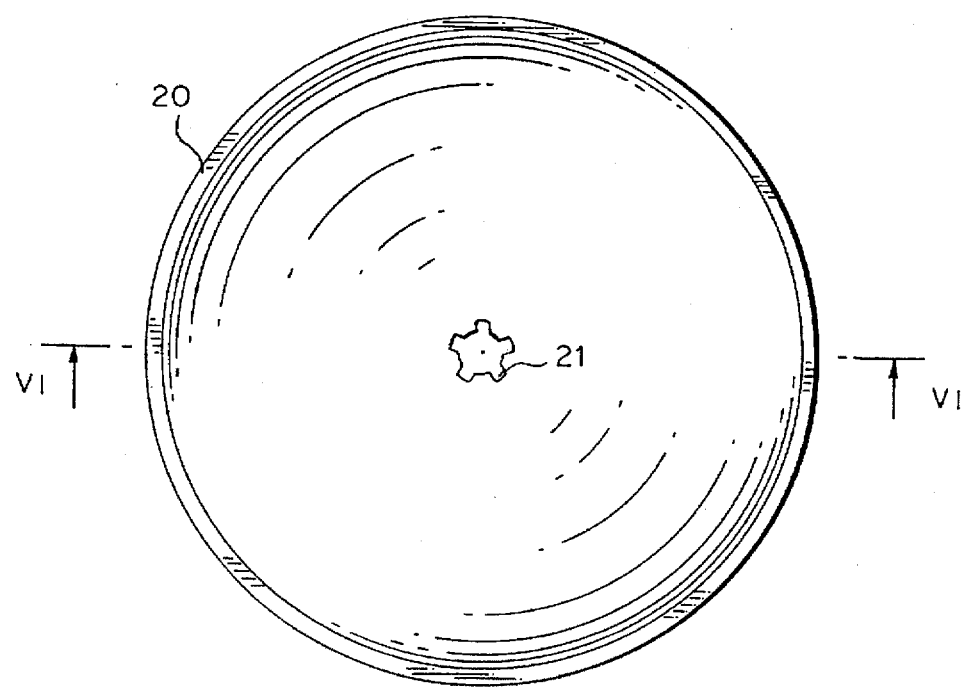
FIG. 7 is a cross section of the upper part of the absorber.

Once the acoustic protection 6 is bonded together with the payload fairing 1, as shown in FIG. 3, its structural resonance frequencies preferably lie above the frequency range of the acoustic effectiveness of the absorber 8 by a factor >1.5. In this way the acoustical resonance frequency is decoupled from the structural resonance frequency.

To attain sufficient sound absorption at frequencies <90 Hz, the length L of the absorber 8 is selected to be greater than 100 mm.

In a preferred embodiment, in which the sound-absorbing effectiveness lying in the frequency range <90 Hz, in particular in the 31.5 and 63 Hz octave band, is optimized, the acoustic absorber 8 has a length L of 135 mm, a diameter D of 249.6 mm, a diameter $D_t$ of the horn throat of 18 mm and a distance a of 10 mm between the horn 18 and the bottom 14.

In this embodiment of the absorber 8 the structural resonance frequencies of the acoustic protection 6 lie in the range of >150 Hz. Its weight per unit area, including the adhesive for fastening on the payload fairing 1, is less than 3.5 kg/m².

Figure 8:
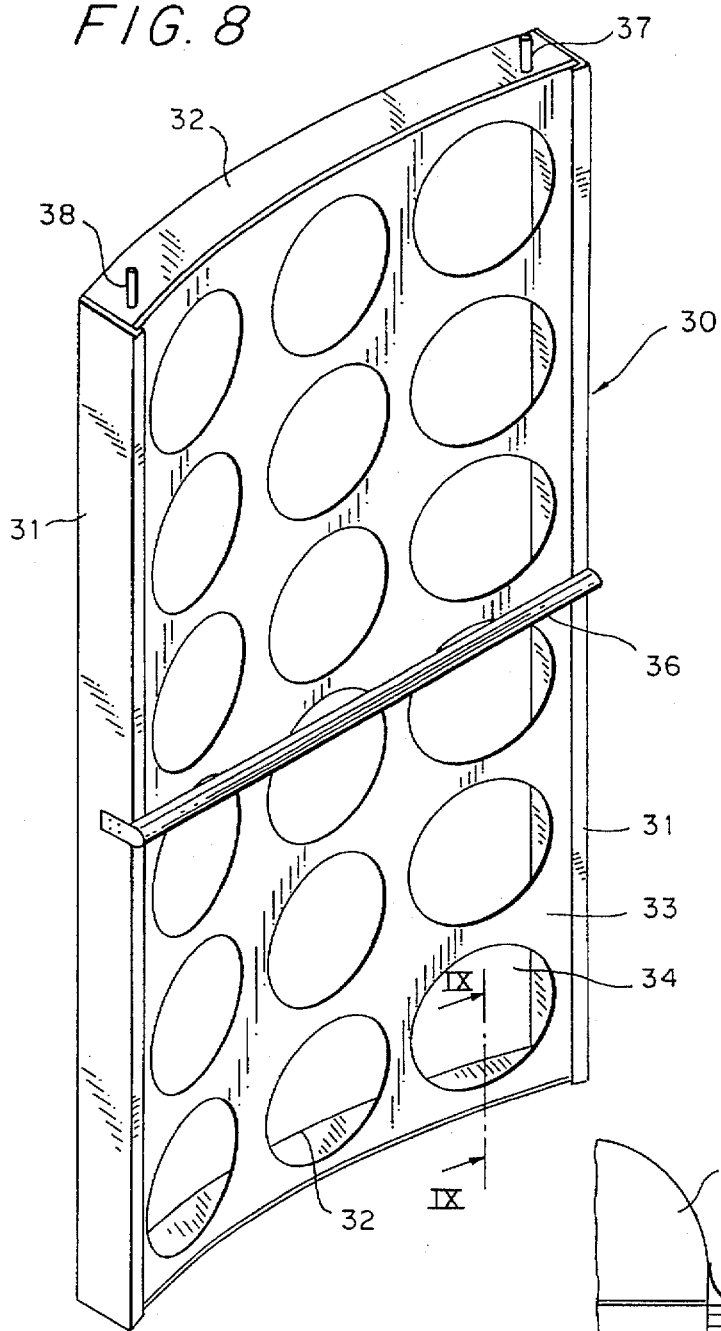
FIG. 8 is a perspective representation of an assembly frame for the integration of the acoustic protection in accordance with FIG. 2.
Figure 9:
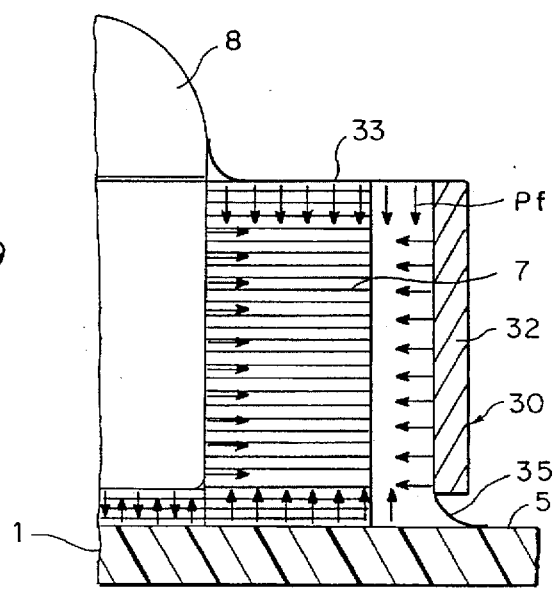
FIG. 9 is a section along the line IX—IX of FIG. 8.

In accordance with FIGS. 8 and 9, an assembly frame 30 adapted to the size of the foamed plastic mats 7 consists of two angle-shaped linear supports 31 and two transverse supports 32 which are fixedly connected with each other. A sealing mask 33, for example of caoutchouc, is disposed on the top of the assembly frame 30 and in correspondence to the standardized foamed plastic mat 7 has eighteen circular cutouts 34 to receive the acoustic absorbers 8 fastened in the foamed plastic mat 7. The diameters of the cutouts 34 are less than the diameters of the acoustic absorbers 8, so that the sealing mask 33 is deformed when the assembly frame 30 is placed on it and, when underpressure is applied, it rests airtight against the acoustic absorbers 8. Sealing lips 35, which can also be made of caoutchouc, for example, are provided on the lower edges of the linear supports 31 and the transverse supports 32. The two linear supports 31 are connected at the center by at least one strip 36. A suction connector 37, which can be connected with an underpressure generator, not shown in detail, and a pressure control connector 38 are provided in one of the transverse supports 32.

For fastening the foamed plastic mats 7 on the inside 5 of the payload fairing 1, the assembly frame 30 is placed around the foamed plastic mat 7 respectively to be bonded on and an underpressure is generated which is effective in the entire foamed plastic mat 7 (see the direction of effectiveness of the exterior pressure indicated by the arrows Pf in FIG. 9), so that the surfaces to be bonded together are well pressed together in all places. The underpressure is maintained until the adhesive connection has cured.

Figure 10:
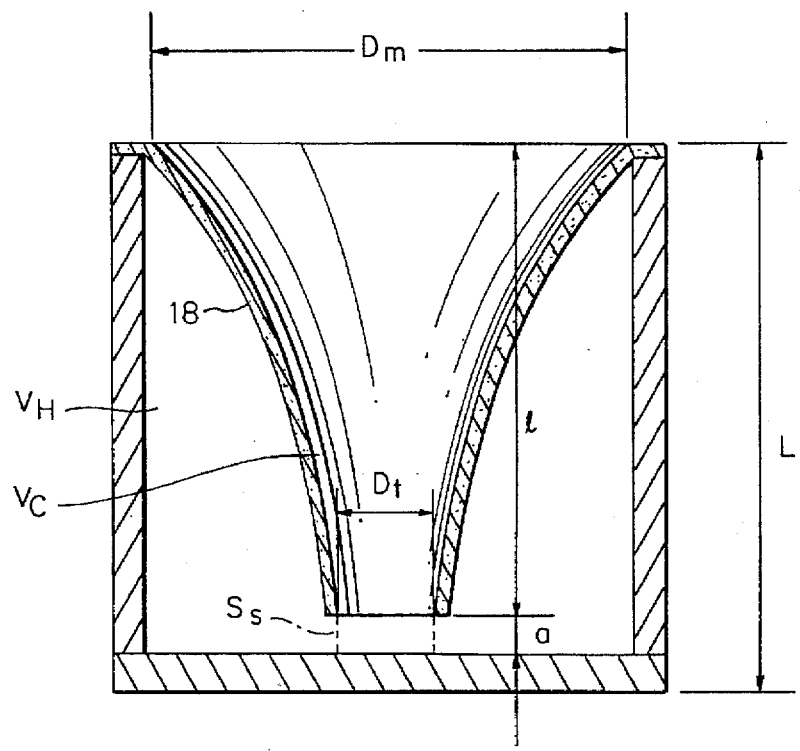
FIG. 10 is a schematic representation of the acoustic absorber.

In FIG. 10, the diameter of a horn mouth is indicated by $D_m$, a horn volume by $V_c$, a cell volume by $V_H$ and the length of the horn 18 by l. The distance a, the length L and the diameter $D_t$ of the horn throat have the same meaning as in FIGS. 3 to 7. $S_s$ indicates a slit area calculated from the distance a and the diameter $D_t$ of the horn throat.

Figure 11:
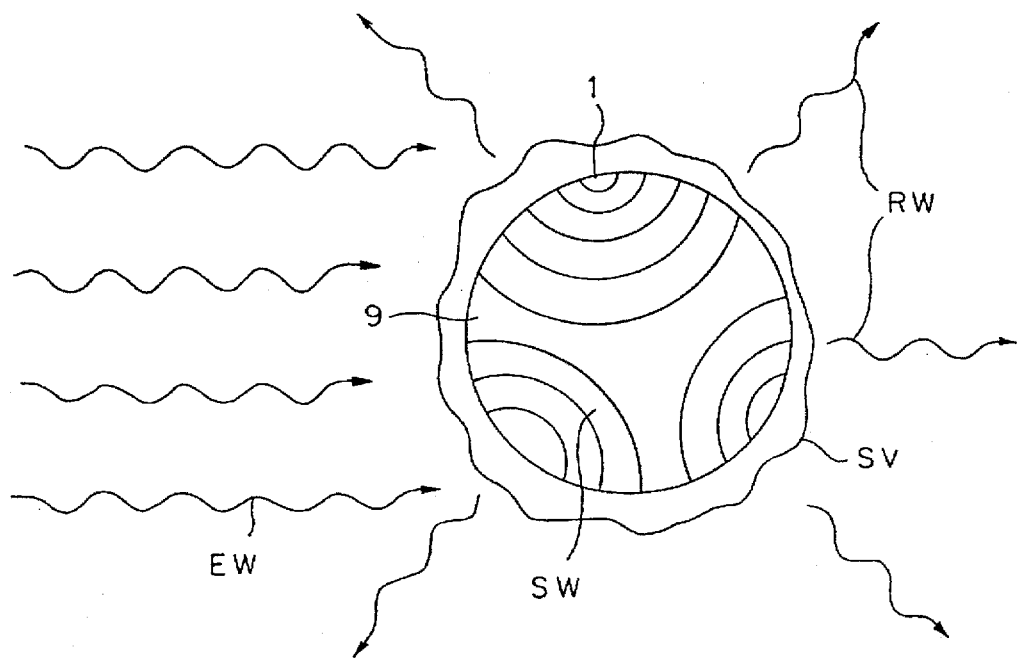
FIG. 11 is a schematic representation of the effects of sound waves on the payload fairing.

In accordance with FIG. 11, emitted sound waves, symbolized by wavy lines, are indicated by EW, reflected sound waves by RW and vibrations by SV, and standing waves symbolized by curved lines by SW.

The dimensions of the acoustic absorber 8 described above by means of FIGS. 3 to 7 and required for a defined frequency range can be determined in a manner similar to the resonators proposed by Helmholtz and used for acoustic analyses. In their original form such resonators consisted of hollow spheres with two oppositely located openings, one of which was directed toward the sound source, the other was formed to fit an ear and was applied like an ear trumpet. If a sound source generates frequency components which correspond to a large extent with the resonance frequency of the hollow sphere resonator, it will amplify this harmonic, which will be the only one which can be heard.

The proposed acoustic absorber 8 in accordance with FIG. 10 can be considered as an optimized Helmholtz resonator/absorber, whose special properties mainly result from the combination of the cell volume $V_H$, horn volume $V_c$ and the slit area $S_s$. In an analogy with a mechanical spring/mass system, the cell volume $V_H$ operates similar to a spring, wherein the air in the area of the slit area $S_s$, which vibrates because of the external sound effect, can be considered as mass m. This vibrating mass m is increased to a mass m* by the vibrating air in the horn volume $V_c$, so that the vibration system yields a lower resonance frequency, the level of which is determined by the size and shape of the acoustic absorber 8.

In detail, the resonance frequency f of the acoustic absorber 8 is a function of the following parameters:

$S_t$, the cross sectional area related to the diameter $D_t$ of the horn throat,
$V_H$, the cell volume,
$D_t$, the diameter of the horn throat,
$D_m$, the diameter of the horn mouth,
l, the horn length.

In the above mentioned spring/mass system, the resonance frequency $f_o$ is given by $$f_0 = \frac{1}{2\pi} \sqrt{\frac{S}{m}}$$ Equation 1 wherein S means the spring stiffness which corresponds to the stiffness of the cell volume $V_H$ and which results from the relationship:

$$S = \frac{\rho c^2 S_s^2}{V_H}.$$ Equation 2 wherein c is the speed of sound and $\rho$ the specific mass of the cell volume continuum. The effective vibrating mass m* can be expressed by:

$$m^* = \rho S_s l^*,$$ Equation 3 wherein l* means the effective height of the vibration continuum. If the equations 2 and 3 are inserted into the equation 1, the classic relationship for the resonance frequency in a Helmholtz resonator/absorber is obtained:

$$f_{0H} = \frac{c}{2\pi} \sqrt{\frac{S_s}{V_H l^*}}$$ Equation 4 and, with l* corresponding to $l^*_{SAA}$, wherein SAA stands for "Special Acoustic Absorber", and the cross-sectional area $S_t$ related to the diameter $D_t$ of the horn throat, the lower resonance frequency of the acoustic absorber 8 is obtained:

$$f_{0SAA} = \frac{c}{2\pi} \sqrt{\frac{S_t}{V_H l^*_{SAA}}}$$ Equation 5

In equation 5 $l^*_{SAA}$ is referenced to the throat area $S_t$ and is composed of the three components relating to the horn throat, the horn cone and the horn mouth:

$$l^*_{SAA} = l^*_t + l^*_c + l^*_m$$ Equation 6

$$m^*_{SAA} = S_t l^*_{SAA}$$ Equation 7

While the effective length $l^*_t$ of the horn throat and $l^*_m$ of the horn mouth were obtained by means of tests, the effective length $l^*_c$ relating to the horn cone can be calculated with the aid of the equivalent kinetic energy of the vibrating continuum. Assuming that all gas particles within the cone are vibrating in phase to each other, the continuity equation reads:

$$u_t S_t = u_x S_x = u_m S_m.$$ Equation 8 applies. The kinetic energy of the vibrating continuum is defined as:

$$E_{kin_c} = \frac{\rho}{2} \int_{L-l}^{L} S_x u_x^2 \, dx = \frac{\rho}{2} l^*_c S_t u_t^2.$$ Equation 9

Introducing:

$$S_x = S_t \left( \frac{x}{(L-l)} \right)^2$$ Equation 10 and $$u_x^2 = u_t^2 \left( \frac{S_t}{S_x} \right)^2$$

wherein $S_x$ is the local cross-sectional area of the horn at the axial coordinate x, l is the horn length, $u_x$ is the local particle velocity (axially directed, oscillating) and $u_{t-}$ is the local particle velocity in the horn throat.

The evaluation of equation 9 yields:

$$l^*_c = \frac{L-l}{L} \; l = \frac{D_t}{D_m} \; l \qquad \text{Equation 11}$$

When inserting equation 11 into equation 6, and equation 6 into equation 5, the approximated lower resonance frequency of the Special Acoustic Absorber (SAA), equation 5, can be expressed by:

$$f_{0_{SAA}} = \frac{c}{2\pi} \sqrt{\frac{S_t}{V_H \left( l^*_t + \frac{D_t}{D_m} \; l + l^*_m \right)}} \qquad \text{Equation 12}$$

Therefore, it is possible to approximately obtain the desired lower resonance frequency of the acoustic absorber 8 with equation 12 by selecting the dimensions and the shapes.

The mode of functioning of the above described acoustic protection will be described in greater detail by means of FIGS. 1, 3 and 11:

The sound waves EW generated by the noise emission from the propulsion system of the rocket impinge on the payload fairing 1, in the course of which reflected sound waves RW are generated and the payload fairing 1 is set into vibration SV. In the course of this, standing waves SW are generated within the payload accomodation volume 9 which act on the acoustic protection 6. The sound absorption of the foamed plastic mats 7 is effective in the frequency range of >100 Hz and that of the acoustic absorber 8 at frequencies of <90 Hz. Based on the special shaping of the acoustic absorber 8, the pulsing air flow of the impinging sound waves is bundled in the process, so that high flow velocities are attained in the slits 21 of the horn 18. Flow separation occurs at the sharp edges 21.1 of the slits 21, because of which the directed flow energy is converted into turbulence and finally into heat (dissipation).

List of Reference Numerals:

| | |
|---|---|
| 1 | Payload fairing |
| 2 | Half shells |
| 3 | Ogival part |
| 4 | Cylindrical part |
| 5 | Insides |
| 6 | Acoustic protection |
| 7 | Foamed plastic mats |
| 7.1 | Top |
| 7.2 | Lateral faces |
| 8 | Acoustic absorber |
| 9 | Payload accomodation volume |
| 10 | Opening |
| 11 | Protective foil |
| 12 | Lower part |
| 13 | Upper part |
| 14 | Bottom |
| 15 | Circular bead |
| 16 | Radial beads |
| 17 | Rim |
| 18 | Horn |
| 19 | Torus |
| 20 | Angle-shaped rim |
| 21 | Slits |
| 21.1 | Sharp edges |
| 22 | Crimped flange |
| 23 | Circular cutouts |
| 24 | Foamed plastic disk |
| 25 | Thermal protection insulation layer |
| 30 | Assembly frame |
| 31 | Linear support |

-continued

List of Reference Numerals:

| | |
|---|---|
| 32 | Transverse support |
| 33 | Sealing mask |
| 34 | Circular cutouts |
| 35 | Sealing lips |
| 36 | Strip |
| 39 | Suction connector |
| 38 | Control connector |
| $D_m$ | Diameter of the horn mouth |
| $D_t$ | Diameter of the horn throat |
| $V_c$ | Horn volume |
| $V_H$ | Cell volume |
| l | Length of the horn |
| a | Distance horn - bottom |
| b | Width of the crown-shaped slit |
| c | Height of the crown-shaped slit |
| L | Length of the absorber |
| D | Diameter of the absorber |
| $S_s$ | Slit area |
| Pf | Arrows |
| EW | Emitted sound waves |
| RW | Reflected sound waves |
| SV | Vibrations |
| SW | Standing waves |
| SAA | Special Acoustic Absorber |

What is claimed is:

1. Acoustic protection (6) on payload fairings (1) of an expendable launch vehicle, the fairing having an inside (5); the protection comprising a sound absorbing panel (7) disposed on the inside of the fairing (1) and;

an acoustic absorber (8) tuned to a defined frequency range disposed on the sound-absorbing panel (7); wherein the acoustic absorber (8) further comprises a cup-like lower part (12) and an upper part (13) having a horn (18);

the horn (18) includes a wall which tapers in a curved-conical form from an opening of a large diameter ($D_m$) to an opening of smaller diameter ($D_t$)

the horn (18) projects into the lower part (12) up to a defined distance (a) from a bottom (14) of the lower part (12): and slits (21) are included in the wall of the horn (18) adjacent an opening of the smaller diameter ($D_t$).

2. The acoustic protection in accordance with claim 1, wherein a permeable layer is applied to the horn opening of larger diameter ($D_m$).

3. The acoustic protection in accordance with claim 1, wherein the slits (21 have sharp edges (21.1).

4. The acoustic protection in accordance with claim 3, wherein five slits (21) are provided which are offset by an angle of 72° from each other.

5. The acoustic protection in accordance with claim 3, wherein the width (b) of the slits (21) is 5.6 mm and the height (c) of the slits (21) is 20 mm.

6. The acoustic protection in accordance with claim 1, wherein the lower part (12) and the upper part (13 are made of sheet-metal.

7. The acoustic protection in accordance with claim 5, wherein the sheet-metal thickness is less than 0.5 mm, in particular is 0.3 to 0.4 mm.

8. The acoustic protection in accordance with claim 5, wherein the sheet-metal is an aluminum sheet.

9. The acoustic protection in accordance with claim 1, wherein the lower part (12 and the upper part (13) are made of plastic.

10. The acoustic protection in accordance with claim 1, wherein the lower part (12) and the upper part (13) are produced by an injection molding process.

11. The acoustic protection in accordance with claim 1, wherein the acoustic absorber (8) has a length (L) of >100 mm.

12. The acoustic protection in accordance with claim 1, wherein the acoustic absorber (8) has a length (L) of 135 mm, an overall diameter (D) of 249.5 mm, an opening of smaller diameter ($D_t$) of 18 mm and a distance (a) of 10 mm between the horn (18) and the bottom (14) of the lower part (12).

13. The acoustic protection in accordance with claim 1, wherein the acoustic absorber (8) is tuned to an acoustical frequency <90 Hz, in particular in one of the octave bands of 31.5 and 63 Hz.

14. The acoustic protection in accordance with claim 13, wherein the structural resonance frequency of the absorber (8) is >150 Hz.

15. The acoustic protection in accordance with claim 1, wherein the resonance frequency ($f_{oSAA}$) of the absorber (8) is determined in accordance with the equation $$f_{0_{SAA}} = \frac{c}{2\pi} \sqrt{\frac{S_t}{V_H \left( l^*_t + \frac{D_t}{D_m} l + l^*_m \right)}}$$

wherein $S_t$ means cross-sectional area across the diameter $D_t$ of the horn throat, $V_H$, cell volume, $D_t$, diameter of the horn throat, $D_m$, diameter of the horn mouth, l, horn length, and $l^*_t + l^*_m$, are empirical values.

16. The acoustic protection in accordance with claim 1, wherein the sound-absorbing panels are foamed plastic mats (7) made of reticulated polyimide.

17. The acoustic protection in accordance with claim 1 wherein the sound-absorbing panels comprise foamed plastic mats (7) including oval, elongated pores having longitudinal axes essentially arranged perpendicularly in relation to a surface of the payload fairing (1).

18. The acoustic protection in accordance with claim 17, wherein the foamed plastic mats (7) are made of the foamed plastic Solimide AC-406 of the firm Illbruck of Switzerland.

19. The acoustic protection in accordance with claim 18, wherein the foamed plastic mats (7) have a thickness of approximately 10 cm.

20. The acoustic protection in accordance with claim 16, wherein foamed plastic mats (7) of the same size and with the same number of acoustic absorbers (8).

21. The acoustic protection in accordance with claim 16, wherein the foamed plastic mats (7) are covered with a thin protective foil (11) of polyester on the top (7.1) and the lateral faces (7.2).

22. The acoustic protection in accordance with claim 21, wherein the protective foil (11) consists of a polyester material called Orcofilm of Orcon Corp.

23. The acoustic protection in accordance with claim 21, wherein the protective foil (11) has perforations.

24. The acoustic protection in accordance with claim 16, commprising a crimped flange (22) between the cup-like lower part (12) and the horn (18) of the upper part (13) and a foamed plastic disk (24), and wherein the absorbers (8) are inserted into circular cutouts (23) of the foamed plastic mats (7), wherein they rest with the crimped flange (22) on a top (7.1) of the foamed plastic mats (7) and are bonded together with the top, and the foamed plastic disk (24) is bonded onto the bottom (14) of the acoustic absorber (8).

25. The acoustic protection in accordance with claim 24, wherein the foamed plastic disk (24) includes oval, elongated pores having longitudinal axes disposed essentially perpendicularly in relation to a surface of the payload fairing (1).

26. The acoustic protection in accordance with claim 25, wherein the foamed plastic disk (24) is made of the same material as the foamed plastic mat (7).

27. The acoustic protection in accordance with claim 16, wherein the foamed plastic mats (7) having the absorbers (8) inserted therein are pressure bonded together with the inside (5) of the payload fairing (1) by an assembly frame (30) placed on top of the foamed plastic mat (7) to be bonded down and generated underpressure.

28. The acoustic protection in accordance with claim 27, wherein the assembly frame (30) consists of two angle-shaped linear supports (31) and two transverse supports (32) which are fixedly connected with each other, a sealing mask (33), which has circular cutouts (34) to receive the acoustic absorbers (8), is placed on top of the assembly frame (30), sealing lips (35) are provided on the lower edges of the linear supports (31) and transverse supports (32), the linear supports (31) are connected at the center by at least one strip (36), and a suction connector (37) and a pressure control connector (38) are provided in one of the transverse supports (32).

29. The acoustic protection in accordance with claim 1, wherein a weight per unit area of the acoustic protection, including adhesive for fastening on the payload fairing (1) is less than 3.5 kg/m$^2$.

30. The acoustic protection in accordance with claim 1, wherein:

the lower part (12) further comprises an upper edge (12) and a lower-part rim (17) disposed on the upper edge of the lower part (12);

the curved-conical form of the horn (18) makes a smooth transition from the curved-conical form into a torus form (19) at an opening of larger diameter ($D_m$);

the torus form (19) form makes a smooth transition therefrom into a horn rim (20);

the horn rim is angle-shaped in cross-section; and the lower-part rim and the horn rim are crimped together.

31. The acoustic protection according to claim 17, comprising a foamed plastic disc (24) including the oval, elongated pores.

* * * * *